(12) United States Patent
Kurdziel et al.

(10) Patent No.: US 9,438,416 B2
(45) Date of Patent: Sep. 6, 2016

(54) CUSTOMIZABLE ENCRYPTION ALGORITHM BASED ON A SPONGE CONSTRUCTION WITH AUTHENTICATED AND NON-AUTHENTICATED MODES OF OPERATION

(71) Applicant: HARRIS CORPORATION, Melboure, FL (US)

(72) Inventors: Michael T. Kurdziel, Rochester, NY (US); Matthew Kelly, Dowingtown, PA (US); Alan Kaminsky, Rochester, NY (US); Marcin Lukowiak, Rochester, NY (US); Stanislaw Radziszowski, West Henrietta, NY (US)

(73) Assignee: Harris Corporation, Melbourne, FL (US)

( * ) Notice: Subject to any disclaimer, the term of this patent is extended or adjusted under 35 U.S.C. 154(b) by 63 days.

(21) Appl. No.: 14/334,916

(22) Filed: Jul. 18, 2014

(65) Prior Publication Data

US 2016/0020901 A1    Jan. 21, 2016

(51) Int. Cl.
*H04L 9/08* (2006.01)
*H04L 9/06* (2006.01)
*H04L 9/14* (2006.01)

(52) U.S. Cl.
CPC ............ *H04L 9/0838* (2013.01); *H04L 9/065* (2013.01); *H04L 9/0662* (2013.01); *H04L 9/0668* (2013.01); *H04L 9/14* (2013.01); *H04L 2209/043* (2013.01); *H04L 2209/24* (2013.01)

(58) Field of Classification Search
CPC ... H04L 9/0838; H04L 9/14; H04L 2209/24; H04L 9/0668; H04L 9/0662; H04L 9/065; H04L 2209/043; H04L 9/00
USPC ........................................................ 380/28
See application file for complete search history.

(56) References Cited

U.S. PATENT DOCUMENTS 8,605,897 B2    12/2013   Golic
8,666,064 B2     3/2014   Choi et al.

(Continued)

FOREIGN PATENT DOCUMENTS

SG    WO 2012154129 A1 * 11/2012 ........... H04L 9/0618

OTHER PUBLICATIONS

Bertoni, G., et al., "Duplexing the Sponge: Single-Pass Authenticated Encyrption and Other Applicaitons", found on the web at <<http://sponge.noekeon.org/papers.html> [Jul. 8, 2014].

(Continued)

*Primary Examiner* — William Goodchild
(74) *Attorney, Agent, or Firm* — Fox Rothschild LLP; Robert J. Sacco; Carol Thorstad-Forsyth

(57) ABSTRACT

Systems (100) and methods (600) for generating encrypted data. The methods involve: combining a cryptographic key with state initialization bits to generate first combination bits; producing a first keystream by performing a permutation function $f$ using the first combination bits as inputs thereto; and using the first keystream to encrypt first data (e.g., authentication data or message body data) so as to produce first encrypted data. The permutation function $f$ comprises a round function $f_{round}$ that is iterated R times. The round function $f_{round}$ consists of (1) a substitution layer in which the first combination bits are substituted with substitute bits, (2) a permutation layer in which the substitute bits are re-arranged, (3) a mixing layer in which multiple of the permutation layer are combined together, and (4) an addition layer in which a constant is added to the output of the mixing layer.

20 Claims, 6 Drawing Sheets

(56) References Cited

U.S. PATENT DOCUMENTS

| | | |
|---|---|---|
| 8,687,800 B2 | 4/2014 | Patel |
| 8,713,311 B1 | 4/2014 | Roskind |
| 8,751,822 B2 | 6/2014 | Anderson |
| 8,756,429 B2 | 6/2014 | Banerjee, Jr. et al. |
| 8,756,674 B2 | 6/2014 | Ronda et al. |
| 2010/0049986 A1* | 2/2010 | Watanabe ............ H04L 9/0643 713/181 |

OTHER PUBLICATIONS

Bertoni., G., "Cyrptographic Sponge Functions", found on the web at <<http://sponge.noekeon.org/papers.html>> [Jul. 8, 2014].

Wood, Christopher A., "Large Substitution Boxes with Efficient Combinational Implementions", found on the Web at <https://ritdml.rit.edu/bitstream/handle/1850/17008/CWoodThesis8-2013.pdf?sequence=1> [Jul. 8, 2014].

* cited by examiner

US 9,438,416 B2

CUSTOMIZABLE ENCRYPTION ALGORITHM BASED ON A SPONGE CONSTRUCTION WITH AUTHENTICATED AND NON-AUTHENTICATED MODES OF OPERATION

BACKGROUND

1. Statement of the Technical Field

The inventive arrangements relate to cryptographic systems. More particularly, the inventive arrangements concern cryptographic systems implementing a customizable encryption algorithm based on a sponge construction with authenticated and non-authenticated modes of operation.

2. Description of the Related Art

Sponge functions may be used in cryptographic applications. In this regard, the sponge functions can be used to implement symmetric cryptography functionalities (e.g., key derivation, message encryption, and authentication code computation). A detailed discussion of sponge functions is provided in a document entitled "Cryptographic Sponge Functions", which was written by Bertoni et al. and published on Jan. 14, 2011 ("Bertoni"). As stated in Bertoni, a sponge function instantiates a sponge construction. The sponge construction is a simple iterated construction for building a function F based on a fixed length permutation. The function F has a variable-length input and an arbitrary output length. The fixed length permutation operates on a state of $b=r+c$ bits, where r is the bitrate and c is the capacity. The capacity c determines the security level of the sponge construction.

During operation, each of the bits b is initialized to zero and an input message is cut into blocks of r bits. Thereafter, absorbing operations are performed in which: the r bits of each block are respectively XORed with the first r initialized bits; and a first permutation operation is performed using the results of the XOR operation as inputs. Next, squeezing operations are performed in which a second permutation operation is performed using the output bits of the first permutation operation as input bits. The output of the second permutation operation may then be truncated to the first l bits.

Duplex constructions are closely related to the sponge construction. Duplex constructions comprise a plurality of duplexing stages. During a first duplexing stage, all bits of the state are set to zero and a first input string $\tau_0$ is padded. The first input string $\tau_0$ is then XORed with the first r initialized bits. Then, a permutation function is applied to the results of the XOR operations so as to generate a set of first output bits. The first output bits are then truncated to the first l bits. In a next duplexing stage, a second input string $\tau_1$ is padded. The second input string $\tau_1$ is then XORed with the first output bits of the first duplexing stage. The permutation function is applied to the results of the XOR operations so as to generate a set of second output bits. The second output bits are then truncated to the first l bits.

SUMMARY OF THE INVENTION

The invention concerns implementing systems and methods for generating encrypted data (e.g., ciphertext). The methods involve: combining a cryptographic key with state initialization bits to generate first combination bits; producing a first keystream by performing a permutation function $f$ using the first combination bits as inputs thereto; and using the first keystream to encrypt first data (e.g., authentication data or message body data) so as to produce first encrypted data (e.g., via modular arithmetic). The permutation function $f$ comprises a round function $f_{round}$ that is iterated R times. The round function $f_{round}$ consists of (1) a substitution layer in which the first combination bits are substituted with substitute bits, (2) a permutation layer in which the substitute bits are re-arranged, (3) a mixing layer in which at least two outputs of the permutation layer are combined together, and (4) an addition layer in which a constant is added to the output of the mixing layer.

The cryptographic key may be concatenated with a flag value prior to being combined with the state initialization bits. The first keystream may be truncated to a desired length prior to being used to encrypt the first data. The first data may be padded to make a total number of bits contained therein a multiple of the total number of state initialization bits prior to being encrypted. A multi-bit value for the state initialization bits may be selected that is unique for a given application.

In some scenarios, the present invention is implemented in a sponge framework. Accordingly, the method may additionally comprise: producing a second keystream by performing the permutation function $f$ using the first keystream as inputs thereto; and using the second keystream to encrypt second data (e.g., other message data) so as to produce second encrypted data.

In other scenarios, the present invention is implemented in a duplex framework. Accordingly, the first encrypted data is produced by: combining the first keystream with authentication data to generate the second combination bits; producing a second keystream by performing the permutation function $f$ using the second combination bits as inputs thereto; and combining the second keystream with the message body data so as to produce the first encrypted data. An authentication tag is generated by: combining the second keystream with the message body data to produce the third combination bits; producing a third keystream by performing the permutation function $f$ using the third combination bits as inputs thereto; and using at least a portion of the third keystream as the authentication tag.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
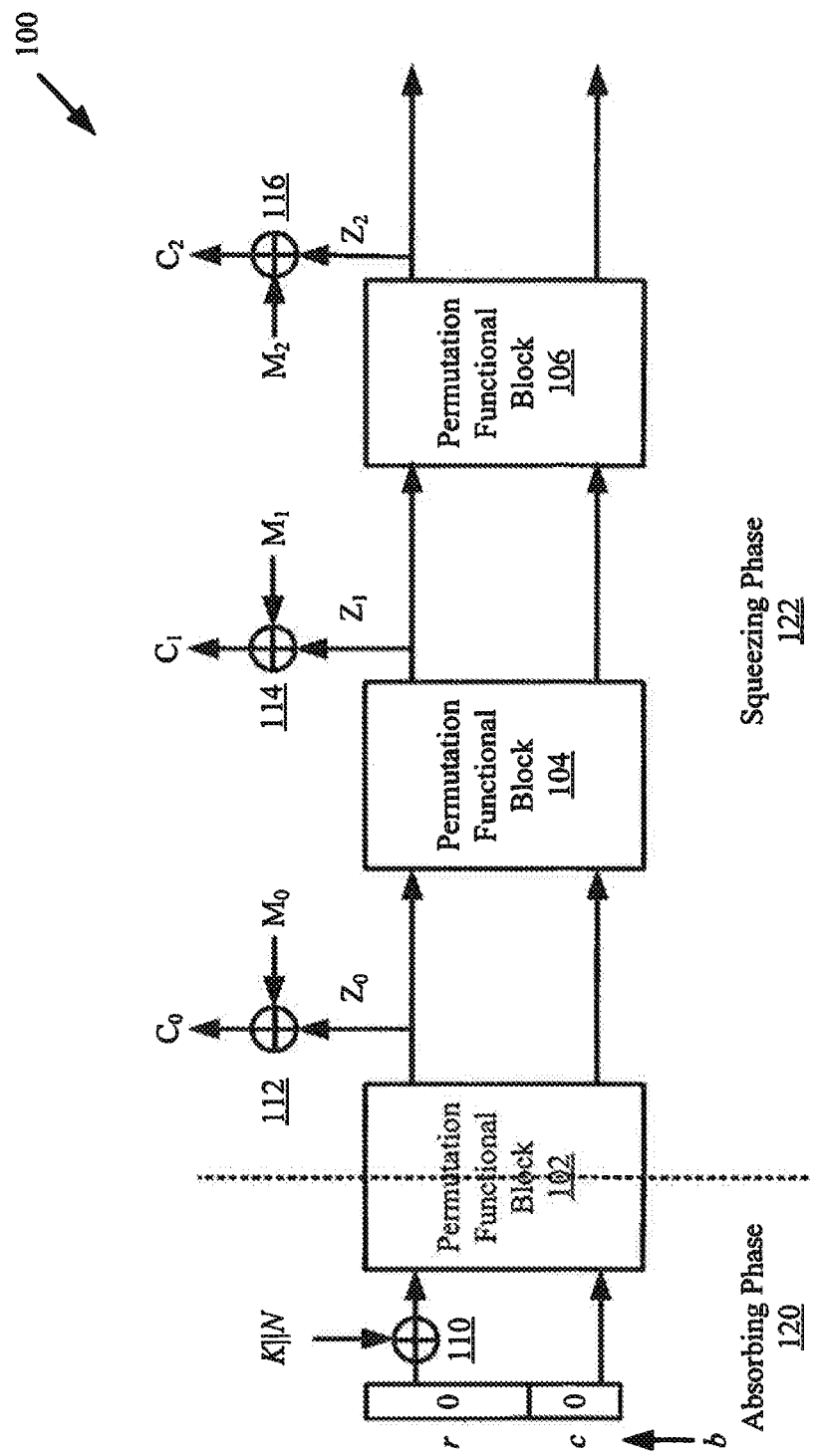
FIG. 1 is a schematic illustration of an exemplary sponge construction employing a unique permutation function.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Sponge and duplex constructions provide frameworks representing new cryptographic paradigms with many advantages including processing performance and provable computational cryptographic strength. A novel cryptographic algorithm design is described herein that is based on the sponge and duplex construction frameworks. More particularly, the novel cryptographic algorithm comprises a unique permutation function $f$ that is used with a sponge construction and/or a duplex construction. In this regard, the present invention provides the same advantages of conventional sponge and duplex constructions, as well as other additional advantages. These other additional advantages include, but are not limited to: the provision of a highly configurable and customizable cryptographic algorithm; the provision of a symmetric key algorithm that is designed against a military threat model; the provision of increased throughput suitable to support high-rate networked waveforms; and the provision of an algorithm that can be used with key lengths that are longer than the key lengths which can be used with conventional cryptographic algorithms. Longer key lengths result in a higher level of security.

Referring now to FIG. 1, there is provided a schematic illustration of an exemplary architecture for a sponge construction 100 implementing the present invention. Notably, the sponge construction 100 uses a unique permutation function $f$ (described below) to provide the traditional suite of cryptographic modes. This will become more evident as the discussion progresses.

As shown in FIG. 1, the sponge construction 100 is generally designed to implement symmetric cryptography functionalities, namely key derivation and message encryption. The sponge construction 100 is a simple iterated construction for building a function F based on a unique permutation function $f$. The function F has a variable-length input and an arbitrary output length. The unique permutation function $f$ operates on a state of b=r+c bits, where r (e.g., 128 bits) is the bitrate and c (e.g., 384 bits) is the capacity. The capacity c determines the security level of the sponge construction.

Notably, the sponge construction 100 can be implemented in hardware, software or a combination of both hardware and software. As such, the operations of each functional block 102-106 may be implemented using hardware and/or software. The hardware can include, but is not limited to an electronic circuit. The electronic circuit can include passive components, active components and logical components.

The sponge construction 100 is divided into two phases. The first phase is an absorbing phase 120 in which the cryptographic key K or K||N (i.e., a concatenation of the cryptographic key K and a flag N) is absorbed into a state of the sponge construction 100 while interleaving with applications of the underlying permutation function $f$. Such absorption is achieved by combining K (or K||N) with the first r bits of the initialized state bits b. In some scenarios, the bits b (e.g., 512 bits) are initialized to zero. The present invention is not limited in this regard. The bits b (e.g., 512 bits) may alternatively be initialized to any bit value (e.g., any 512 bit value). As such, each user could generate its own unique value to set during the initialization phase.

The combining of K (or K||N) with the first r bits of the initialized state can be achieved via exclusive OR ("XOR") operations 110, as shown in FIG. 1. XOR operations are well known in the art, and therefore will not be described in detail here. Still, it should be understood that the XOR operations are performed on a bit-by-bit basis. The result of each XOR operation is true whenever an odd number of inputs are true and false whenever an even number of inputs are true. The results of the XOR operations are then passed to permutation functional block 102 where the results are interleaved with applications of the unique permutation function $f$.

The second phase is a squeezing phase 122 in which keystream blocks $Z_0$, $Z_1$, $Z_2$ are produced by the performance of the unique permutation function $f$ in permutation functional blocks 102-106. Each keystream block $Z_0$, $Z_1$, $Z_2$ comprises r bits. The unique permutation function $f$ will be described in detail below. Still, it should be understood that the permutation function $f$ maps each possible value of the bits input thereto into a particular unique value of the output bits. Notably, permutation functional block 102 takes the output of the absorbing phase 120 as an input. Permutation functional block 104 takes the output of permutation functional block 102 as an input. Permutation functional block 106 takes the output of permutation functional block 104 as an input.

Next, the keystream blocks $Z_0$, $Z_1$, $Z_2$ are used to encrypt a message M. In this regard, the keystream blocks $Z_0$, $Z_1$, $Z_2$ can be truncated to a desired length l. Additionally or alternatively, the message M may be padded to make it a multiple of r (if it is not a multiple of r). The message M is parsed into a plurality of message blocks $M_0$, $M_1$, $M_2$. Each message block $M_0$, $M_1$, $M_2$ comprises a plurality of bits of the message M. Each keystream block is then combined with a respective message block so as to produce an encrypted data block. The encrypted data block can include, but is not limited to, a ciphertext block $C_0$, $C_1$ or $C_2$. The present invention is described herein in relation to ciphertext. The present invention is not limited in this regard. The present invention can be used to encrypt any type of data (e.g., text, audio, video, etc. . . . ).

In some scenarios, the combining of the keystream and message blocks is achieved using modular arithmetic. For example, each keystream block $Z_0$, $Z_1$, $Z_2$ is combined with a respective block of message bits $M_0$, $M_1$, $M_2$ via modulo 2 addition. The modulo 2 addition can be implemented using an XOR operation, as shown in FIG. 1. The XOR operation is performed on a bit-by-bit basis. As such, a first bit $m_0$ of a message block $M_0$, $M_1$ or $M_2$ is combined with a first bit $z_0$ of a respective keystream block $Z_0$, $Z_1$ or $Z_2$ via modulo 2 addition. Next, a second bit $m_1$ of a message block $M_0$, $M_1$ or $M_2$ is combined with a first bit $z_1$ of a respective keystream block $Z_0$, $Z_1$ or $Z_2$ via modulo 2 addition, and so on.

Figure 2:
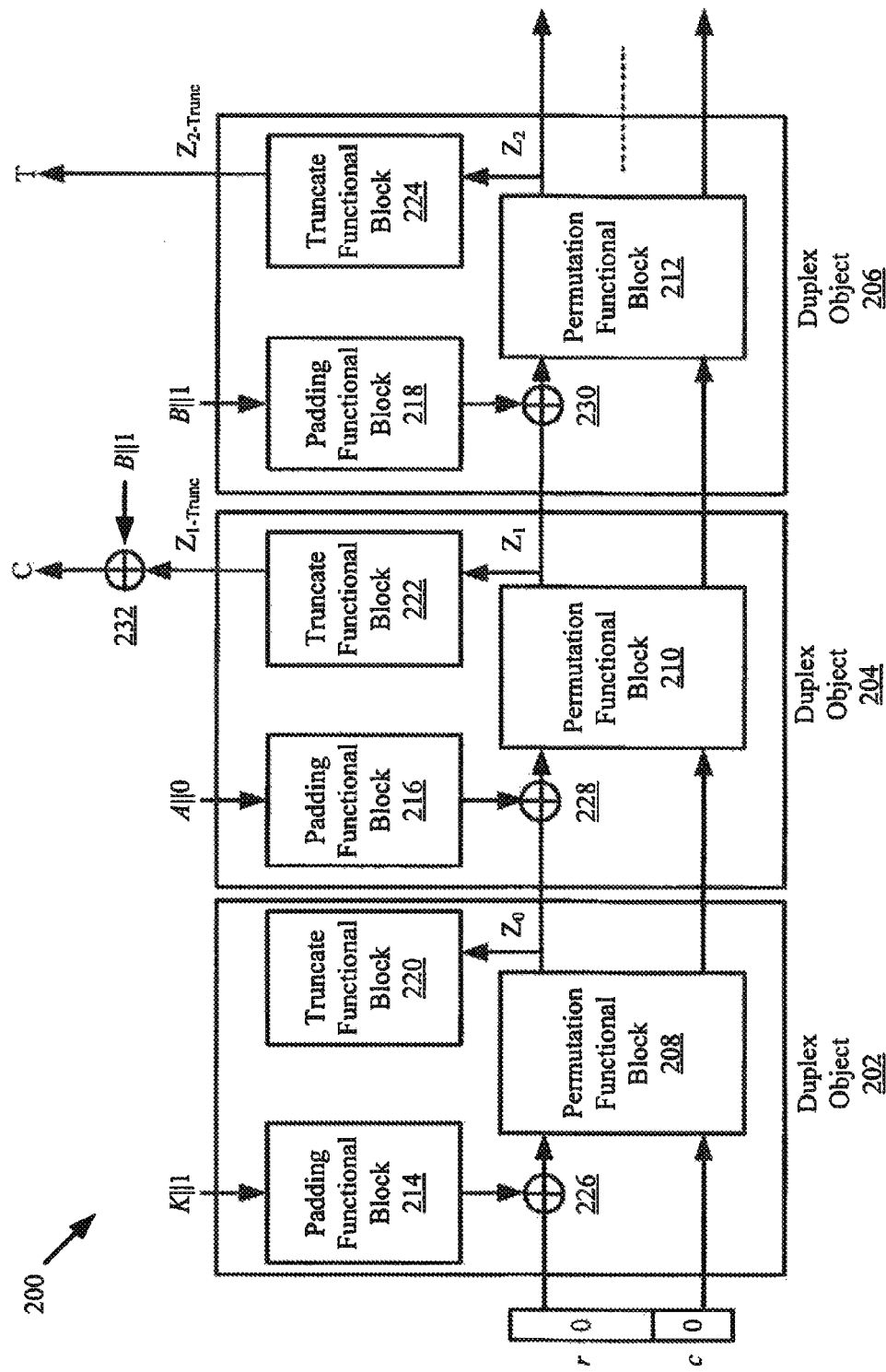
FIG. 2 is a schematic illustration of an exemplary duplex construction employing a unique permutation function.

Referring now to FIG. 2, there is provided a schematic illustration of an exemplary architecture for a duplex construction 200 implementing the present invention. The duplex construction 200 is an adaptation of the sponge construction framework that, together with the unique permutation function $f$ (described below), provides an additional Authenticated Encryption ("AE") cryptographic mode. This mode allows both source and integrity verification of encrypted traffic. This will become more evident as the discussion progresses.

Notably, the duplex construction 200 can be implemented in hardware, software or a combination of both hardware and software. As such, the operations of each component 202-232 may be implemented using hardware and/or software. The hardware can include, but is not limited to an electronic circuit. The electronic circuit can include passive components, active components and logical components.

In the duplex construction 200, the absorbing phase and squeezing phase are combined into each of a plurality of duplex operations. Accordingly, the duplex construction 200 comprises a plurality of duplex objects 202-206. The operations of each duplex object will be described separately below. Notably, the state of each duplex object call is preserved.

The input to duplex object 202 is a cryptographic key K (or optionally K∥1, i.e. a concatenation of the cryptographic key K and a flag 1). The cryptographic key K (or optionally K∥1) is padded in padding functional block 214 to make it a multiple of r (if it is not a multiple of r). The padding can involve appending bits to the beginning or end of the cryptographic key K (or optionally K∥1). Next, the output of padding functional block 214 is then combined with the first r bits of the initialized state bits b. In some scenarios, the bits b are initialized to zero, where b=r+c. The present invention is not limited in this regard. The bits b (e.g., 512 bits) may alternatively be initialized to any bit value (e.g., a 512 bit value). As such, each user could generate its own unique value to set during the initialization phase.

The combining of the padding functional block output and the first r bits of the initialized state can be achieved via XOR operations 110, as shown in FIG. 1. XOR operations are well known in the art, and therefore will not be described in detail here. Still, it should be understood that the XOR operations are performed on a bit-by-bit basis. The results of the XOR operations are then passed to permutation functional block 208. In permutation functional block 208, the unique permutation function $f$ is performed using the results of the XOR operations as inputs so as to generate a keystream block $Z_0$. The keystream block $Z_0$ is then truncated to a desired length l, as shown by truncate functional block 220. The value of l here can be less than r.

The input to duplex object 204 is authentication data A (or optionally A∥0, i.e. a concatenation of authentication data A and a flag 0). The authentication data A can include but is not limited to, authenticated packet headers. The authentication data A (or optionally A∥0) is padded in padding functional block 216 to make it a multiple of r (if it is not a multiple of r). The padding of padding functional block 216 is the same as or similar to that of padding functional block 214. Next, the output of padding functional block 216 is then combined with keystream block $Z_0$. This combining can be achieved via XOR operations 228, as shown in FIG. 2. XOR operations are well known in the art, and therefore will not be described in detail here. Still, it should be understood that the XOR operations are performed on a bit-by-bit basis. The results of the XOR operations are then passed to permutation functional block 210. In permutation functional block 210, the unique permutation function $f$ is performed so as to generate a keystream block $Z_1$. The keystream block $Z_1$ is then optionally truncated to a desired length l, as shown by truncate functional block 222. The value of l here can be less than r. Truncation may be performed when the number of bits contained in the message body B is less than r. In this case, the value of l equals the number of bits contained in the message body B. The truncated keystream block $Z_{1-Trunc}$ is output from duplex object 204.

Thereafter, the truncated keystream block $Z_{1-Trunc}$ is combined with a message body B (or optionally B∥1, i.e. a concatenation of message body B and a flag 1). The message body B can include, but is not limited to, packet payload. This combining is achieved via XOR operations 232, which produces encrypted data (e.g., ciphertext) C. The XOR operations 232 are performed on a bit-by-bit basis.

The input to duplex object 206 is message body data B (or optionally B∥1). The message body data B can include but is not limited to, packet payload data. The message body data B (or optionally B∥1) is padded in padding functional block 218 to make it a multiple of r (if it is not a multiple of r). The padding of padding functional block 218 is the same as or similar to that of padding functional blocks 214 and 216. Next, the output of padding functional block 218 is then combined with keystream block $Z_1$. This combining can be achieved via XOR operations 230, as shown in FIG. 2. XOR operations are well known in the art, and therefore will not be described in detail here. Still, it should be understood that the XOR operations are performed on a bit-by-bit basis. The results of the XOR operations are then passed to permutation functional block 212. In permutation functional block 212, the unique permutation function $f$ is performed so as to generate a keystream block $Z_2$. The keystream block $Z_2$ is then optionally truncated to a desired length l, as shown by truncate functional block 224. The value of l here can be less than r. The truncated keystream block $Z_{2-Trunc}$ is output from duplex object 204. The truncated keystream block $Z_{2-Trunc}$ is then used as an authentication tag T.

In a communications scenario, the encrypted data (e.g., ciphertext) C and the authentication tag T would be transmitted from a source communication device to a destination communication device. The cryptographic key K would not be transmitted since it would be known by both devices.

The advantages of the duplex construction 200 are that: a single cryptographic key is required; encryption and authentication requires only a single pass; intermediate tags are supported thereby; additional authentication data (e.g., packet headers) is supported thereby; it is secure against generic attacks; and the ability to trade off speed and security by adjusting the value of r.

Figure 3:
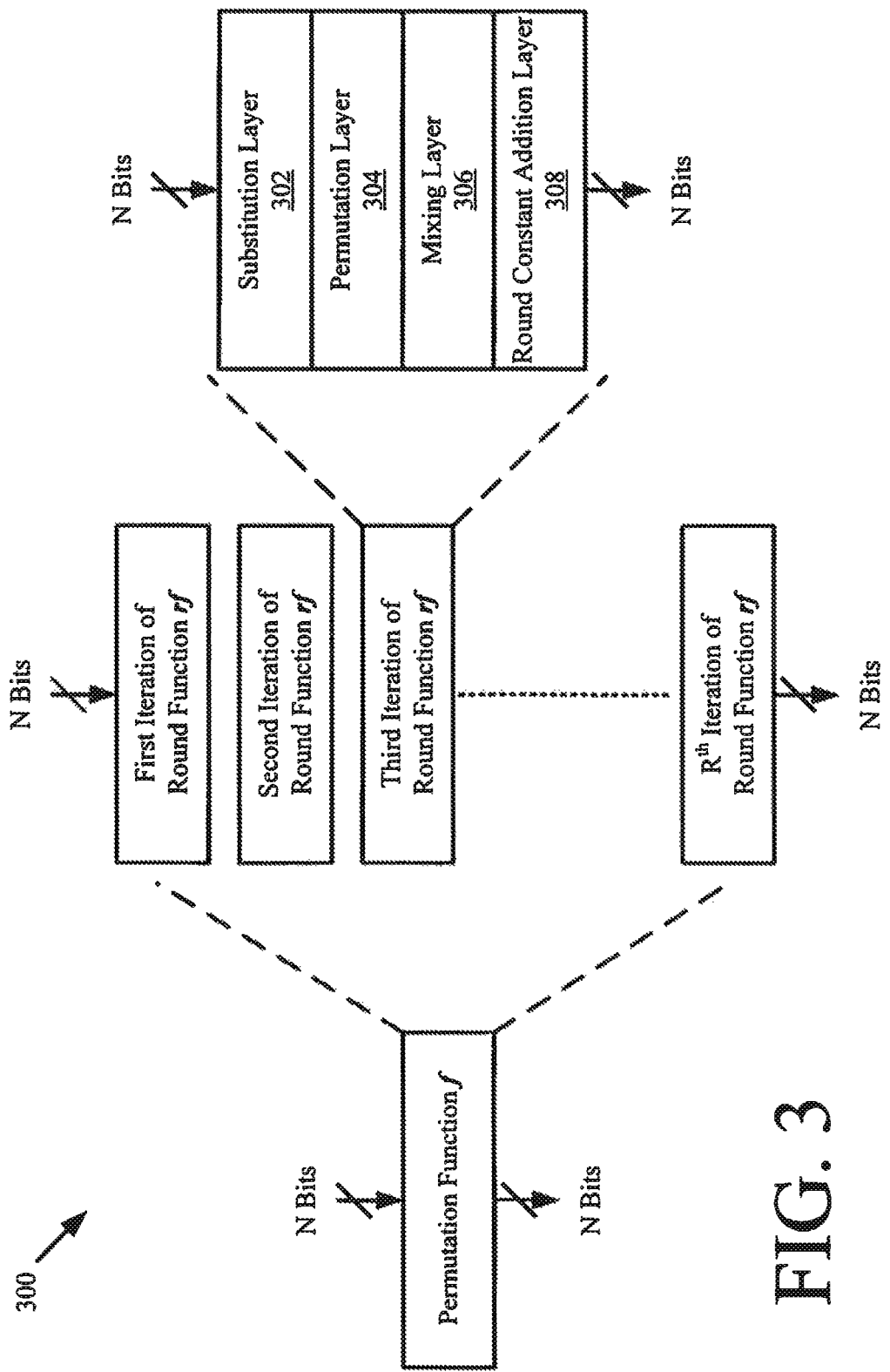
FIG. 3 is a schematic illustration that is useful for understanding the unique permutation function $f$ of the present invention.

Referring now to FIG. 3, there is provided a schematic illustration that is useful for understanding the unique permutation function $f$ of the present invention which is employed in the sponge and duplex constructions described above in relation to FIGS. 1-2. The permutation function $f$ supports any key size (e.g., 128 bits or 256 bits) and is bijective. Since the permutation function $f$ is bijective, $f^{-1}$ (inverse of $f$) exists by definition. While $f^1$ is not used in practice, it may be helpful for crypto-analysis and verification purposes. Notably, the number of bits that are input and/or output from the permutation function $f$ is also customizable.

The permutation function $f$ comprises a round function $f_{round}$ that is iterated R times, depending on the key size. The round function $f_{round}$ consists of the following layers: a substitution layer 302; a permutation layer 304; a mixing layer 306; and a round constant addition layer 308. In the substitution layer 302, the bits input thereto are substituted with first substitute bits in accordance with a particular transformation and/or mapping algorithm. For example, input bits 010001 are substituted with bits 1010. The number of bits input/output to/from the substitution layer 302 can be the same or different. In the permutation layer 304, the bits input thereto are re-arranged. In the mixing layer 306, at least two outputs of the permutation layer are combined together. In the round constant addition layer 308, a constant is added to the output of the mixing layer. The manners in which the operations of each layer 302-308 are achieved will be discussed in detail below.

Notably, R is an integer which has a value large enough to resist differential attacks, linear attacks and other attacks depending on the cryptographic key size (e.g., R=10 for a 128 bit key or R=16 for a 256 bit key). In this regard, R is a customizable element of the permutation function $f$. In some scenarios, R is determined by (1) calculating the number of rounds needed for linear and differential cryptoanalysis and (2) adding some buffer to increase the security margin.

Figure 4:
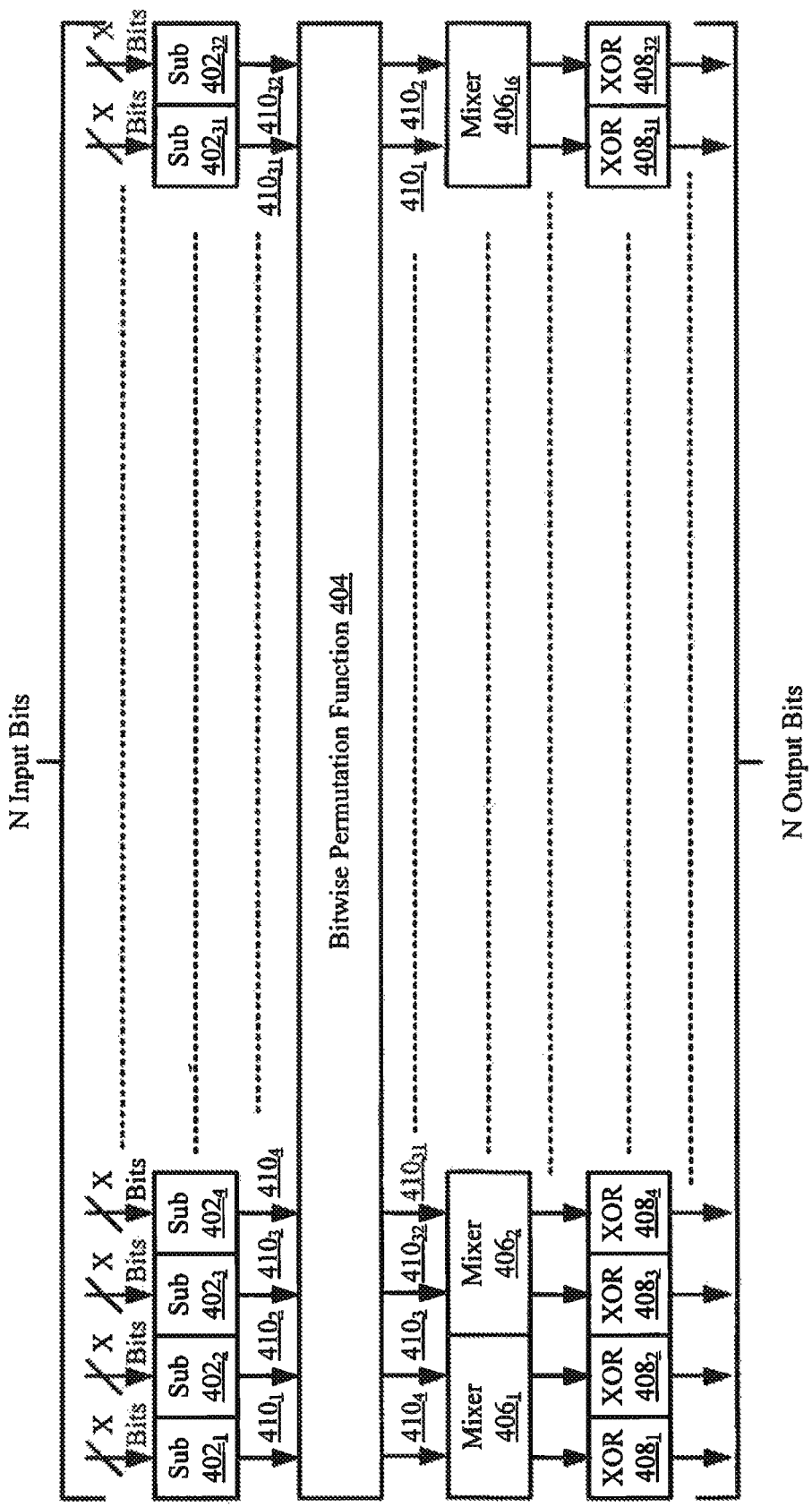
FIG. 4 is an expanded bock diagram of the round function $f_{round}$ shown in FIG. 3.

Referring now to FIG. 4, there is provided an expanded block diagram of the round function $f_{round}$. The substitution layer 302 comprises a plurality of identical substitution boxes (or S-boxes) $402_1, 402_2, 402_3, 402_4, \ldots, 402_{31}, 402_{32}$ which collectively receive N input bits (e.g., 512 input bits) and individually receive X bits of the N input bits (e.g., 16 bits of 512 input bits). The value of N is selected to be large enough to keep a cryptographic key secure. For example, the value of N is selected to be 512 bits for a cryptographic key having a size of 128 bits or 256 bits.

The purpose of the S-boxes is to perform substitution so as to obscure the relationship between the cryptographic key and encrypted data (e.g., ciphertext). S-boxes are well known in the art, and therefore will not be described in detail herein. Any known or to be known S-box can be used herein without limitation provided that the following properties are satisfied thereby.

(1) The S-boxes have small differential probabilities.
(2) The S-boxes have small linear approximation biases.
(3) The S-boxes have a customizable number of input bits X.
(4) The S-boxes have customizable mapping functions.

For example, each S-box $402_1, 402_2, 402_3, 402_4, \ldots, 402_{31}, 402_{32}$ comprises an X-bit-to-X-bit S-box or an X-bit-by-Y-bit S-box, where X is a customizable integer and Y is a customizable integer different from X. The S-boxes can be implemented as look-up tables or in hardware using logical gates (e.g., XOR gates and AND gates). The look-up tables can be fixed or dynamically generated using the cryptographic key.

In some scenarios, each S-box comprises a bijective 16-bit-to-16-bit S-box. An exemplary architecture for such an S-box is described in Appendix C of a document entitled "Large Substitution Boxes with Efficient Combinational Implementations" which was written by Wood and published in August 2013. This S-box is based on a multiplicative inversion in $GF(2^{16})/\langle p(x)\rangle$, where $p(x)=x^{16}+x^5+x^3+x+1$. An input to the S-box is represented as a 16-bit column vector $x=(x_{15}\ x_{14}\ \ldots\ x_1\ x_0)^T$, $x_{15}$ is the most significant bit. Using this notation, the forward S-box function is defined by the following mathematical equation.

$$Y = S(X) = \left[\begin{pmatrix} 0 & 0 & 1 & 0 & 0 & 0 & 0 & 1 & 0 & 0 & 1 & 1 & 1 & 1 & 1 & 0 \\ 1 & 1 & 0 & 0 & 0 & 0 & 0 & 1 & 0 & 1 & 1 & 0 & 1 & 0 & 1 & 0 \\ 1 & 1 & 0 & 0 & 1 & 0 & 1 & 1 & 0 & 1 & 0 & 1 & 0 & 0 & 1 & 1 \\ 1 & 1 & 1 & 0 & 0 & 0 & 1 & 0 & 0 & 1 & 1 & 0 & 0 & 0 & 0 & 0 \\ 1 & 1 & 0 & 0 & 0 & 1 & 1 & 0 & 0 & 1 & 1 & 1 & 1 & 0 & 1 & 1 \\ 0 & 1 & 0 & 0 & 0 & 0 & 1 & 1 & 0 & 1 & 1 & 1 & 1 & 1 & 0 & 1 \\ 0 & 0 & 1 & 0 & 1 & 0 & 1 & 0 & 1 & 1 & 0 & 0 & 1 & 1 & 0 & 0 \\ 1 & 0 & 1 & 1 & 1 & 0 & 1 & 1 & 0 & 0 & 0 & 1 & 0 & 1 & 1 & 1 \\ 0 & 1 & 0 & 0 & 0 & 0 & 0 & 0 & 1 & 0 & 0 & 1 & 1 & 1 & 0 & 1 \\ 1 & 0 & 1 & 1 & 0 & 0 & 0 & 1 & 0 & 0 & 1 & 0 & 1 & 0 & 0 & 0 \\ 1 & 0 & 1 & 0 & 0 & 1 & 1 & 1 & 0 & 0 & 1 & 1 & 0 & 1 & 0 & 0 \\ 1 & 0 & 1 & 1 & 1 & 0 & 1 & 1 & 1 & 1 & 0 & 1 & 1 & 0 & 0 & 1 \\ 1 & 0 & 1 & 0 & 0 & 1 & 0 & 1 & 1 & 0 & 0 & 1 & 0 & 0 & 0 & 1 \\ 0 & 1 & 0 & 0 & 0 & 1 & 1 & 1 & 1 & 0 & 0 & 0 & 0 & 0 & 0 & 1 \\ 1 & 0 & 0 & 0 & 1 & 1 & 0 & 1 & 0 & 1 & 1 & 1 & 1 & 0 & 0 & 0 \\ 1 & 1 & 0 & 1 & 0 & 1 & 1 & 0 & 1 & 0 & 0 & 1 & 1 & 0 & 0 & 0 \end{pmatrix}\begin{pmatrix} x_{15} \\ x_{14} \\ x_{13} \\ x_{12} \\ x_{11} \\ x_{10} \\ x_9 \\ x_8 \\ x_7 \\ x_6 \\ x_5 \\ x_4 \\ x_3 \\ x_2 \\ x_1 \\ x_0 \end{pmatrix}^{-1} \oplus \begin{pmatrix} 0 \\ 1 \\ 0 \\ 0 \\ 0 \\ 1 \\ 0 \\ 1 \\ 1 \\ 0 \\ 1 \\ 1 \\ 0 \\ 1 \\ 1 \\ 1 \end{pmatrix}\right]$$

The inverse of the S-box function is defined by the following mathematical equation.

$$X = S^{-1}(Y) =$$

$$\begin{bmatrix} \begin{pmatrix} 0 & 1 & 0 & 1 & 0 & 1 & 1 & 1 & 0 & 0 & 1 & 0 & 0 & 0 & 0 & 1 \\ 1 & 1 & 0 & 1 & 0 & 0 & 1 & 0 & 1 & 0 & 1 & 1 & 1 & 1 & 0 & 1 \\ 1 & 0 & 1 & 1 & 1 & 1 & 0 & 1 & 0 & 1 & 1 & 0 & 0 & 0 & 0 & 0 \\ 0 & 0 & 1 & 0 & 1 & 1 & 1 & 0 & 1 & 0 & 1 & 1 & 1 & 0 & 1 & 0 \\ 1 & 1 & 1 & 1 & 1 & 0 & 0 & 0 & 1 & 0 & 0 & 0 & 0 & 1 & 0 & 0 \\ 0 & 0 & 0 & 1 & 0 & 1 & 0 & 0 & 0 & 0 & 1 & 1 & 1 & 1 & 1 & 1 \\ 1 & 0 & 1 & 0 & 0 & 0 & 0 & 0 & 0 & 1 & 1 & 0 & 1 & 0 & 1 & 1 \\ 0 & 0 & 1 & 0 & 1 & 1 & 1 & 0 & 0 & 1 & 0 & 1 & 1 & 1 & 1 & 0 \\ 0 & 0 & 0 & 0 & 0 & 0 & 1 & 0 & 0 & 0 & 1 & 0 & 0 & 0 & 1 & 0 \\ 1 & 1 & 1 & 0 & 0 & 1 & 1 & 1 & 1 & 0 & 1 & 1 & 1 & 0 & 0 & 0 \\ 0 & 1 & 1 & 0 & 1 & 1 & 1 & 1 & 0 & 0 & 1 & 0 & 1 & 1 & 1 & 1 \\ 1 & 0 & 0 & 1 & 1 & 0 & 0 & 0 & 1 & 0 & 0 & 1 & 1 & 0 & 1 & 1 \\ 1 & 0 & 0 & 0 & 0 & 1 & 0 & 1 & 1 & 1 & 0 & 0 & 1 & 0 & 1 & 0 \\ 1 & 0 & 0 & 0 & 0 & 1 & 1 & 1 & 1 & 1 & 0 & 1 & 1 & 1 & 1 & 1 \\ 1 & 1 & 1 & 0 & 0 & 1 & 1 & 0 & 1 & 0 & 0 & 1 & 1 & 1 & 1 & 1 \\ 0 & 1 & 0 & 0 & 1 & 0 & 1 & 0 & 1 & 0 & 0 & 1 & 0 & 0 & 0 & 1 \end{pmatrix} \begin{pmatrix} y_{15} \\ y_{14} \oplus 1 \\ y_{13} \\ y_{12} \\ y_{11} \\ y_{10} \oplus 1 \\ y_9 \\ y_8 \oplus 1 \\ y_7 \oplus 1 \\ y_6 \\ y_5 \oplus 1 \\ y_4 \oplus 1 \\ y_3 \\ y_2 \oplus 1 \\ y_1 \oplus 1 \\ y_0 \oplus 1 \end{pmatrix} \end{bmatrix}^{-1}$$

The above-described S-box can be implemented in hardware using 1238 XOR gates and 144 AND gates.

The permutation layer 304 comprises a bitwise permutation function 404. The purpose of the bitwise permutation function 404 is to permute or change a bit position of each bit 410₁, 410₂, 410₃, 410₄, . . . , 410₃₁, 410₃₂ input thereto relative to all other bits input thereto. Bitwise permutation functions are well known in the art, and therefore will not be described in detail herein. Any known or to be known bitwise permutation function can be used herein without limitation provided that the following properties are satisfied thereby.
(1) Each bit 410₁, 410₂, 410₃, 410₄, . . . , 410₃₁, 410₃₂ permutes to an output bit position different from its input bit position.
(2) All outputs of a given S-box go to X different mixers.
(3) The permutation period of the permutation function $f$ exceeds the number of rounds R.
For example, the bitwise permutation function includes a linear permutation function, an affine permutation function, or a random permutation function.

In some scenarios, the bitwise permutation function 404 comprises an affine function defined by the following mathematical equation.

$$\pi(x) = ax + \beta \pmod{512}$$

where $\pi(x)$ represents the output bit position, a is an integer constant (e.g., 31), x represents the input bit position and $\beta$ is an integer constant (e.g., 15).

The mixing layer 306 comprises a mixing function that is implemented via a plurality of mixers 406₁, 406₂, . . . , 406₁₆. In the scenario shown in FIG. 4, one mixer is provided for every two S-boxes. The present invention is not limited in this regard. The particular number of S-boxes per mixer is customizable. Also, the mixing function is a customizable element of the present invention. The purpose of the mixing function is to provide local diffusion (i.e., across two words) and increase the linear and differential branch numbers of a round from two to three. In this regard, mixers based on matrix multiplication in Galois Field $GF(2^M)$ may be employed because they satisfy all of the following constraints: the matrix is invertible in $GF(2^{16})/<p(x)>$; the matrix has a differential and linear branch number equal to three; and the transformation is efficiently implementable in hardware.

In some scenarios, operations performed by each mixer 406₁, 406₂, ..., 406₁₆ is defined by the following mathematical equation.

$$p(x) = x^{16} + x^5 + x^3 + x^2 + 1$$ The mixer takes in two words $W_1$ and $W_2$ as input and produces outputs $W'_1$ and $W'_2$ as follows.

$$\begin{pmatrix} W'_1 \\ W'_2 \end{pmatrix} = \begin{pmatrix} 1 & x \\ x & x+1 \end{pmatrix} \begin{pmatrix} W_1 \\ W_2 \end{pmatrix}$$

Figure 5:
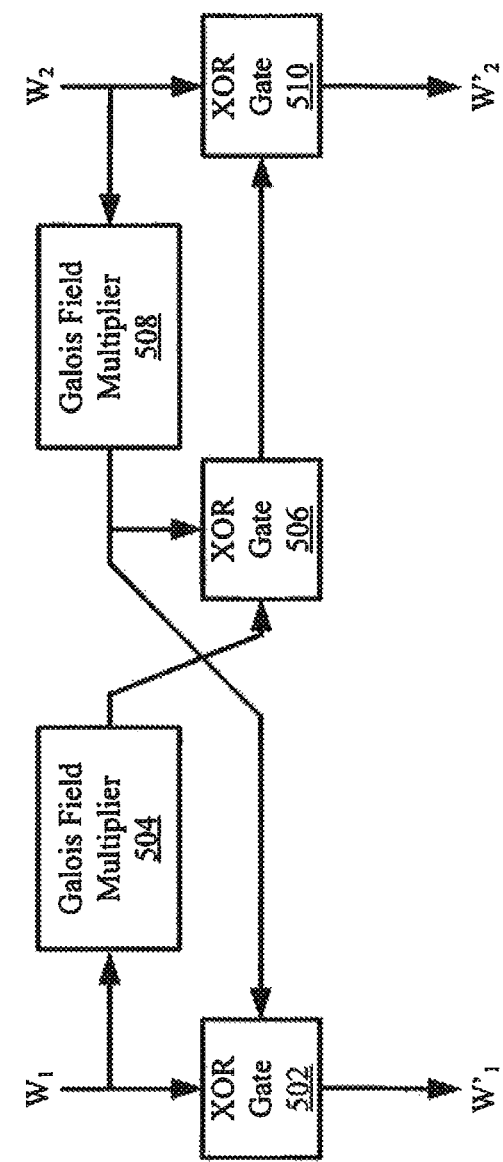
FIG. 5 is a schematic illustration of an exemplary hardware implementation of a mixer.

The mixer is implementable in hardware. An exemplary hardware implementation of the mixer is provided in FIG. 5. As shown in FIG. 5, the mixer comprises XOR gates 502, 506, 510 and Galois field multipliers 504, 508. The Galois field multipliers 504, 508 perform multiplication by x in Galois field $GF(2^x)$.

The round constant addition layer 308 comprises a plurality of addition operations represented by blocks 408₁, 408₂, 408₃, 408₄, . . . , 408₃₁, 408₃₂. The purpose of the addition operations is to add a constant N bit value to the state using bitwise XOR in order to disrupt symmetry and prevent slide attacks. Notably, the round constant must be fixed random N-bit values. Each round i must use a different round constant. The round constant is customizable, and should be unique for each round to prevent against slide attacks and be random, pseudorandom or highly asymmetric to reduce symmetry in the state.

In some scenarios, the round constant $RC_i$ for round i is given by the following mathematical equation.

$$RC_i = \text{SHA3-N}(\text{ASCII}(i))$$

where ASCII(i) is a function that provides a one or two byte ASCII representation of round i and SHA3-512 is the SHA-3 hash function that outputs an N (e.g., 512) bit message digest. The following TABLE 1 provides the values of the round constant $RC_i$ up to i=16.

TABLE 1

| Constant | Hex Value |
|---|---|
| $RC_1$ | 00197a4f5f1ff8c356a78f6921b5a6bfbf71df8dbd313fbc5095a55de756bfa1<br>ea7240695005149294f2a2e419ae251fe2f7dbb67c3bb647c2ac1be05eec7ef9 |
| $RC_2$ | ac3b6998ac9c5e2c7ee8330010a7b0f87ac9dee7ea547d4d8cd00ab7ad1bd5f5<br>7f80af2ba711a9eb137b4e83b503d24cd7665399a48734d47fff324fb74551e2 |
| $RC_3$ | ce4fd4068e56eb07a6e79d007aed4bc8257e10827c74ee422d82a29b2ce8cb07<br>9fead81d9df0513bb577f3b6c47843b17c964e7ff8f4198f32027533eaf5bcc1 |
| $RC_4$ | 5058cb975975ceff027d1326488912e199b79b916ad90a3fe2fd01508cd7d7c0<br>1bc8aaa4d21a8473fb15f3b151ab9e44172e9ccb70a5ea04495af3ec03b5153e |

TABLE 1-continued

| Constant | Hex Value |
|---|---|
| $RC_5$ | 84da272d13a44f0898ee4ea53334c255d894cc54d357c55466d760debde482a2<br>44c128df641e80673a8bc34a1620d880b7965e549f313ddccfd506b073413b87 |
| $RC_6$ | bb93aaa23b38ea96c9346ef91e184982bf50e91033f4354ecb20d3c7390c2b41<br>862e8825ec3d0fee0a6f978881f90728c6748e4aed8b732350075d6c2bdd8e4b |
| $RC_7$ | fe32f3eba76626dedf36622bfdc5ccd33db2f3e0dd7c3c128298ea78c1cc7fee<br>1a140edb8e57cd5824c7f4b817c0fc94e70da5b9399faaf9a848a46ad30679e9 |
| $RC_8$ | 952ba02486b818febc0ec98559df27c79357838f011b1e5bc11f2cfb6fc0573e<br>545978c2bc5b390f44907f8da0dfd68206fe4521f86ba6c879ec1e69caed9533 |
| $RC_9$ | b41e6bb4ed20294016399c268da6bf88c89e2dc118a361b3560ee8daed973a8f<br>9778df40e308c1206fa421f97f3fd3f63d2b4b3b57eb5bcbec6ad64d46216b692 |
| $RC_{10}$ | 6954a418cecc43633bd526c2499dfc16b832f58b216b9a8b226a6a0b7918d364<br>a7939004339de0ba08e2b547e64dc5622e24b0c4f8f415d9e0a84cb94b6c5f3f |
| $RC_{11}$ | 2e4b9ad37091e3e5a218c5e57b33ed3470ba4f31fbcf16424684fdd5cde38e88<br>9eae3f018b37af58c24ccc8af57abc2c6911408dd20ef6435e4494a3e6599a06 |
| $RC_{12}$ | aa42aca73bd7f8a17e987f281422b266e44f0de1615d2d393e620c8c5a2c80b4<br>f06178c8455bf98179603f2f1bcb30b2559f282c799e40533b0665f97a2a706a |
| $RC_{13}$ | 969c39ae2dc16834310344c0579d0ffdfde01772dbf9a4cab984953c395d7791<br>1510f39e5f37295e3611a1d46101460daf731ddbdab1ec1bbc512edc44680d8d |
| $RC_{14}$ | 8a1e6ce31f0b526d884b584aa1a5ae4294fcf85fd2e525f959ed1a54233359c7<br>c5fece6d24775e7d4a9ad97c2632a3be5b331a8f580f557b269e7b65123a5992 |
| $RC_{15}$ | 9bd64a932f09672def04b6a94753a3e4087a1c3895078dc70927fcd774888dfd<br>400b95fd1c6a0b2a91a1ba44eea09f5163dba4dfa9da7b8eb97d791cab566437 |
| $RC_{16}$ | 48401f65c2d2d9e71fe47bd80b28d834eee8fff3be9aa4608cba33e6fedce0b1<br>693c80cdc36db7f504e4abea23ccc6729a030f5b3e035fb59c2c788215cf84a8 |

Notably, the present invention is suitable for implementation on Field Programmable Gate Arrays ("FPGAs"). Serial and fully parallel implementations can be used to meet area or performance constraints. The S-boxes may be implemented using composite field techniques and pipelined for higher performance. Also, the present invention can be integrated into Single Chip Crypto ("SCC") systems.

Furthermore, the present invention anticipates future security requirements. Post Quantum Security ("PQS") will become a requirement for radio product customers, as well as provable computational security and quantified theoretical security metrics and analysis processes. The present invention provides a security means that satisfies all of these requirements.

As evident from the above discussion, the present algorithm is highly customizable within a security margin. This customizability is useful in cases where different users want unique, proprietary algorithms. The following features of the present invention are customizable: (1) the state initialization; (2) the number of rounds R; (3) the permutation function $f$; (4) the number of bits N input into the round function; (5) the type, number, parameters and mapping function of the S-boxes; (6) the bitwise permutation function; (7) the mixing function; and (8) the round constants.

Figure 6:
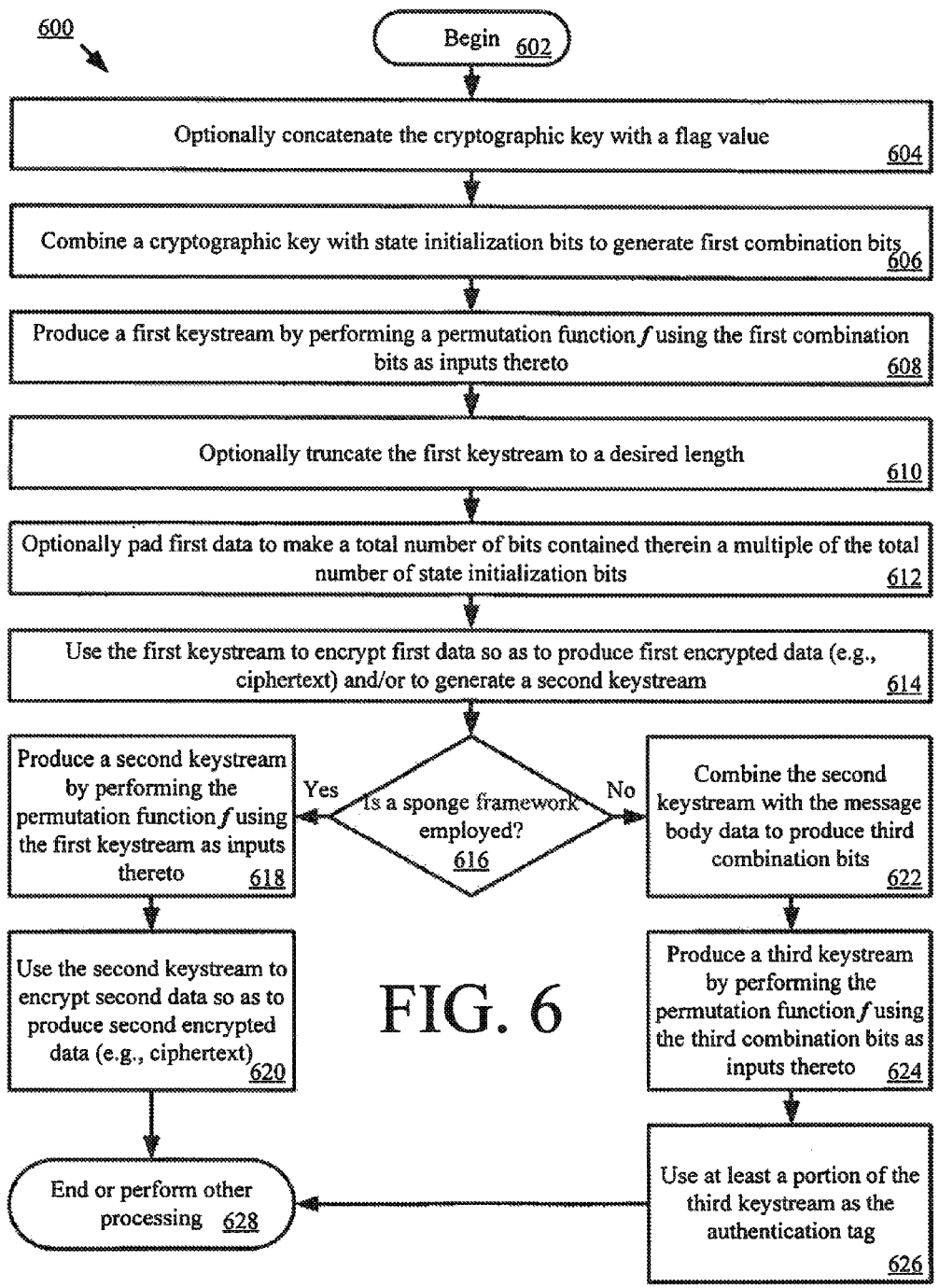
FIG. 6 is a flow diagram of an exemplary method for generating encrypted data that is useful for understanding the present invention.

Referring now to FIG. 6, there is provided a flow diagram of an exemplary method 600 for generating encrypted data (e.g., ciphertext) that is useful for understanding the present invention. Method 600 begins with step 602 and continues with optional step 604. In optional step 604, a cryptographic key is concatenated with a flag value. Next in step 606, the cryptographic key is combined with state initialization bits to generate the first combination bits. A multi-bit value for the state initialization bits may be selected such that it is unique for a given application.

The first combination bits are then used to produce a first keystream, as shown by step 608. The first keystream may optionally be truncated to a desired length, as shown by step 610. The first keystream is produced using a permutation function $f$. The permutation function $f$ is performed using the first combination bits as inputs thereof. The permutation function $f$ comprises a round function $f_{round}$ that is iterated R times. The round function $f_{round}$ consists of (1) a substitution layer in which the first combination bits are substituted with substitute bits, (2) a permutation layer in which the substitute bits are re-arranged, (3) a mixing layer in which at least two outputs of the permutation layer are combined together, and (4) an addition layer in which a constant is added to the output of the mixing layer.

After completing optional step 610, method 600 continues with another optional step 612. Step 612 involves padding the first data to make a total number of bits contained therein a multiple of the total number of state initialization bits prior to being encrypted. The first data is then encrypted using the first keystream, as shown by step 614. In this regard, the first data may be combined with the first keystream using modular arithmetic (e.g., modulo 2 addition). The first data comprises, but is not limited to, authentication data and/or message body data.

If a sponge framework is employed [616: YES], then steps 618-620 are performed. Step 618 involves producing a second keystream by performing the permutation function $f$ using the first keystream as inputs thereto. Step 620 involves using the second keystream to encrypt the second data so as to produce the second encrypted data (e.g., ciphertext). Upon completing step 620, method 600 ends or other processing is performed (e.g., repeat steps 618-620 for a next block of message data), as shown by step 628.

If a duplex framework is employed [616: NO], then steps 622-626 are performed. Prior to discussing steps 622-626, it should be understood that in the duplex context the first encrypted data (e.g., ciphertext) is produced in previous step 614 by: combining the first keystream with authentication data to generate the second combination bits; producing a second keystream by performing the permutation function $f$ using the second combination bits as inputs thereto; and combining the second keystream with the message body data so as to produce the first encrypted data (e.g., ciphertext). The second keystream is also used in step 622 to produce the third combination bits. The third combination bits are input into the permutation function $f$, as shown by step 624. As a result of performing the permutation function $f$, a third keystream is produced. At least a portion of the third keystream is used as an authentication tag.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. A method for generating encrypted data, comprising:
combining, by an electronic circuit, a cryptographic key with state initialization bits to generate first combination bits, the state initialization bits comprising bits b that have been initialized to pre-defined bit values;
producing a first keystream by performing a permutation function $f$ using the first combination bits as inputs thereto, the permutation function $f$ comprising a round function $f_{round}$ that is iterated R times, the round function $f_{round}$ consisting of
 (1) a substitution layer in which the first combination bits are substituted with substitute bits,
 (2) a permutation layer in which the substitute bits are re-arranged,
 (3) a mixing layer in which at least two outputs of the permutation layer are combined together, and
 (4) an addition layer in which a constant is added to the output of the mixing layer; and
using, by the electronic circuit, the first keystream to encrypt first data so as to produce first encrypted data.

2. The method according to claim 1, further comprising concatenating the cryptographic key with a flag value prior to said combining.

3. The method according to claim 1, further comprising selecting a multi-bit value for the state initialization bits that is unique for a given application.

4. The method according to claim 1, further comprising truncating the first keystream to a desired length prior to being used to encrypt the first data.

5. The method according to claim 1, further comprising padding the first data to make a total number of bits contained therein a multiple of the total number of state initialization bits prior to being encrypted.

6. The method according to claim 1, wherein the first data is combined with the first keystream using modular arithmetic.

7. The method according to claim 1, wherein the first data comprises authentication data or message body data.

8. The method according to claim 1, further comprising:
producing a second keystream by performing the permutation function $f$ using the first keystream as inputs thereto; and
using, by the electronic circuit, the second keystream to encrypt second data so as to produce second encrypted data.

9. A method for generating encrypted data, comprising:
combining, by an electronic circuit, a cryptographic key with state initialization bits to generate first combination bits;
producing a first keystream by performing a permutation function $f$ using the first combination bits as inputs thereto, the permutation function $f$ comprising a round function $f_{round}$ that is iterated R times, the round function $f_{round}$ consisting of
 (1) a substitution layer in which the first combination bits are substituted with substitute bits,
 (2) a permutation layer in which the substitute bits are re-arranged,
 (3) a mixing layer in which at least two outputs of the permutation layer are combined together, and
 (4) an addition layer in which a constant is added to the output of the mixing layer; and
using, by the electronic circuit, the first keystream to encrypt first data so as to produce first encrypted data;
wherein the first encrypted data is produced by:
 combining the first keystream with authentication data to generate second combination bits;
 producing a second keystream by performing the permutation function $f$ using the second combination bits as inputs thereto; and
 combining the second keystream with message body data so as to produce the first encrypted data.

10. The method according to claim 9, further comprising generating an authentication tag by:
combining the second keystream with the message body data to produce third combination bits;
producing a third keystream by performing the permutation function $f$ using the third combination bits as inputs thereto; and
using at least a portion of the third keystream as the authentication tag.

11. A system, comprising:
an electronic circuit
 combining a cryptographic key with state initialization bits to generate first combination bits, the state initialization bits comprising bits b that have been initialized to pre-defined bit values,
 producing a first keystream by performing a permutation function $f$ using the first combination bits as inputs thereto, and
 using the first keystream to encrypt first data so as to produce first encrypted data;
wherein the permutation function $f$ comprises a round function $f_{round}$ that is iterated R times, the round function $f_{round}$ consisting of (1) a substitution layer in which the first combination bits are substituted with substitute bits, (2) a permutation layer in which the substitute bits are re-arranged, (3) a mixing layer in which at least two outputs of the permutation layer are combined together, and (4) an addition layer in which a constant is added to the output of the mixing layer.

12. The system according to claim 11, wherein the electronic circuit further concatenates the cryptographic key with a flag value prior to said combining.

13. The system according to claim 11, wherein a multi-bit value for the state initialization bits is selected to be unique for a given application.

14. The system according to claim 11, wherein the electronic circuit further truncates the first keystream to a desired length prior to being used to encrypt the first data.

15. The system according to claim 11, wherein the electronic circuit further pads the first data to make a total number of bits contained therein a multiple of the total number of state initialization bits prior to being encrypted.

16. The system according to claim 11, wherein the first data is combined with the first keystream using modular arithmetic.

17. The system according to claim 11, wherein the first data comprises authentication data or message body data.

18. The system according to claim 11, wherein the electronic circuit further:
  produces a second keystream by performing the permutation function $f$ using the first keystream as inputs thereto; and
  uses the second keystream to encrypt second data so as to produce second encrypted data.

19. A system, comprising:
  an electronic circuit
    combining a cryptographic key with state initialization bits to generate first combination bits,
    producing a first keystream by performing a permutation function $f$ using the first combination bits as inputs thereto, and
    using the first keystream to encrypt first data so as to produce first encrypted data;
  wherein the permutation function $f$ comprises a round function $f_{round}$ that is iterated R times, the round function $f_{round}$ consisting of (1) a substitution layer in which the first combination bits are substituted with substitute bits, (2) a permutation layer in which the substitute bits are re-arranged, (3) a mixing layer in which at least two outputs of the permutation layer are combined together, and (4) an addition layer in which a constant is added to the output of the mixing layer; and
  wherein the first encrypted data is produced by:
    combining the first keystream with authentication data to generate second combination bits;
    producing a second keystream by performing the permutation function $f$ using the second combination bits as inputs thereto; and
    combining the second keystream with message body data so as to produce the first encrypted data.

20. The system according to claim 19, wherein the electronic circuit further generates an authentication tag by:
  combining the second keystream with the message body data to produce third combination bits;
  producing a third keystream by performing the permutation function $f$ using the third combination bits as inputs thereto; and
  using at least a portion of the third keystream as the authentication tag.

* * * * *